(12) United States Patent
Arata

(10) Patent No.: US 7,246,770 B2
(45) Date of Patent: Jul. 24, 2007

(54) AIRCRAFT WITH ROTATABLE LEADING EDGE OF FUSELAGE AND WINGS

(75) Inventor: Allen A. Arata, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 116 days.

(21) Appl. No.: 11/066,354

(22) Filed: Feb. 25, 2005

(65) Prior Publication Data

US 2007/0102586 A1    May 10, 2007

(51) Int. Cl.
*B64C 27/00*    (2006.01)

(52) U.S. Cl. ....................................................... 244/39

(58) Field of Classification Search ...... 244/12.1–12.2, 244/23 A–23 C, 17.21, 36–38, 34 A, 119, 244/214, 218, 45 R, 46, 198, 99.12, 35 A
See application file for complete search history.

(56) References Cited

U.S. PATENT DOCUMENTS

| | | | | |
|---|---|---|---|---|
| 1,215,295 A | * | 2/1917 | MacKay | ...................... 244/218 |
| 1,353,666 A | * | 9/1920 | Page | .......................... 244/210 |
| 1,414,200 A | | 4/1922 | Page | |
| 1,427,012 A | | 8/1922 | Page | |
| 1,606,117 A | * | 11/1926 | Caples | ........................ 244/218 |
| 1,730,249 A | * | 10/1929 | Smith | .......................... 244/218 |
| 1,818,000 A | | 8/1931 | Moles | |
| 1,867,013 A | | 7/1932 | Kratzer | |
| 1,891,261 A | | 12/1932 | Gunn | |
| 1,945,254 A | | 1/1934 | Bittner | |
| 2,500,512 A | | 3/1950 | Bowers | |
| 2,793,826 A | | 5/1957 | Fielder | |
| 3,153,523 A | | 10/1964 | Lowman, III | |
| 3,170,657 A | | 2/1965 | Riebe et al. | |
| 3,447,761 A | | 6/1969 | Whitener et al. | |
| 3,486,720 A | | 12/1969 | Seglem et al. | |
| 3,572,617 A | * | 3/1971 | Ricard | .......................... 244/46 |
| 3,630,471 A | * | 12/1971 | Fredericks | .................... 244/36 |
| 3,638,886 A | | 2/1972 | Zimmer | |
| 3,847,369 A | | 11/1974 | Phillips et al. | |

(Continued)

FOREIGN PATENT DOCUMENTS

EP    0538963 B1    3/1997

(Continued)

OTHER PUBLICATIONS http://www.b737.org.uk/flightcontrols.htm (first available on the World Wide Web Oct. 20, 2001).*

(Continued)

*Primary Examiner*—Teri Pham Luu
*Assistant Examiner*—Edward J. Mayle
(74) *Attorney, Agent, or Firm*—Alan G. Towner, Esq.; Pietragallo, Bosick & Gordon LLP

(57) ABSTRACT

A rotatable leading edge for the fuselage and wings of an aircraft is disclosed. The leading edge may be rotated from an undeflected or retracted position adjacent to the fuselage and wings to a deflected or extended position. In the extended position, the leading edge increases lift of the aircraft at low speeds. In the retracted position, gaps associated with the leading edge are avoided.

15 Claims, 4 Drawing Sheets

U.S. PATENT DOCUMENTS

| | | | |
|---|---|---|---|
| 4,008,867 A | | 2/1977 | Kaniut |
| 4,161,300 A | | 7/1979 | Schwaerzler et al. |
| 4,267,990 A | | 5/1981 | Staudacher |
| 4,384,693 A | | 5/1983 | Pauly et al. |
| 4,494,713 A | * | 1/1985 | Kim .......................... 244/15 |
| 4,585,192 A | | 4/1986 | Clifford-Jones |
| 4,667,898 A | * | 5/1987 | Greenhalgh ................. 244/46 |
| 4,729,528 A | | 3/1988 | Borzachillo |
| D314,366 S | * | 2/1991 | Waaland et al. ........... D12/333 |
| 5,056,741 A | | 10/1991 | Bliesner et al. |
| 5,062,595 A | | 11/1991 | Maxworthy |
| 5,156,358 A | * | 10/1992 | Gerhardt ..................... 244/36 |
| 5,312,070 A | | 5/1994 | Arena |
| 5,538,201 A | * | 7/1996 | Gerhardt ................... 244/204 |
| 5,897,076 A | | 4/1999 | Tracy |
| 5,921,506 A | | 7/1999 | Appa |
| 6,068,219 A | * | 5/2000 | Arata ......................... 244/219 |
| 6,073,889 A | | 6/2000 | Dees et al. |
| 6,129,308 A | | 10/2000 | Nastasi et al. |
| 6,179,248 B1 | * | 1/2001 | Putman et al. ............... 244/36 |
| 6,213,433 B1 | | 4/2001 | Gruensfelder et al. |
| 6,220,551 B1 | | 4/2001 | Saiz |
| 6,227,498 B1 | * | 5/2001 | Arata ......................... 244/219 |
| 6,286,790 B1 | | 9/2001 | Thorpe |
| 6,328,265 B1 | | 12/2001 | Dizdarevic |
| 6,343,768 B1 | * | 2/2002 | Muldoon ..................... 244/7 R |
| 6,375,126 B1 | | 4/2002 | Sakurai et al. |
| 6,475,933 B1 | | 11/2002 | Brown et al. |
| 6,634,594 B1 | * | 10/2003 | Bowcutt ..................... 244/35 A |
| 6,659,394 B1 | * | 12/2003 | Shenk ......................... 244/7 C |
| 6,732,974 B1 | * | 5/2004 | Lewis et al. ............... 244/35 A |
| 2002/0195527 A1 | | 12/2002 | Broadbent |
| 2004/0079839 A1 | * | 4/2004 | Bath et al. ................... 244/131 |

FOREIGN PATENT DOCUMENTS

| | | |
|---|---|---|
| EP | 0781704 B1 | 5/2002 |
| GB | 2003807 A | 3/1979 |
| GB | 2050262 A | 1/1981 |
| GB | 2100684 A | 1/1983 |
| WO | WO 97/49607 | 12/1997 |

OTHER PUBLICATIONS http://www.aircraftresourcecenter.com/AWA1/001-100/walk070_F14/part2/images/doc2-021.jpg, (available on the World Wide Web in 2000).*

* cited by examiner

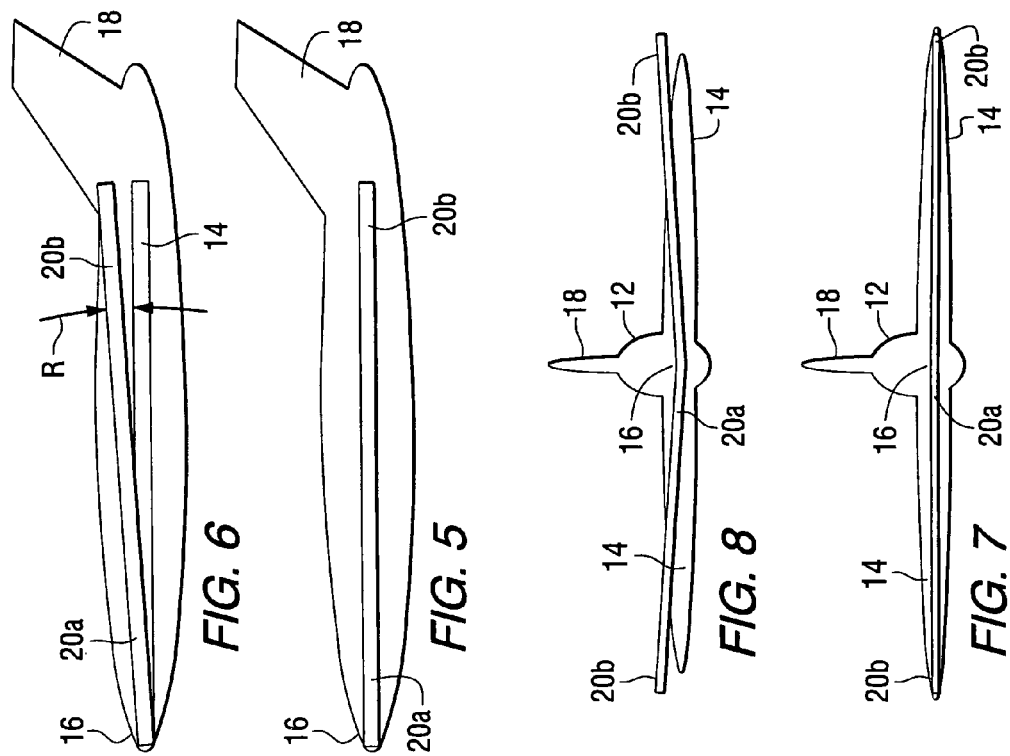
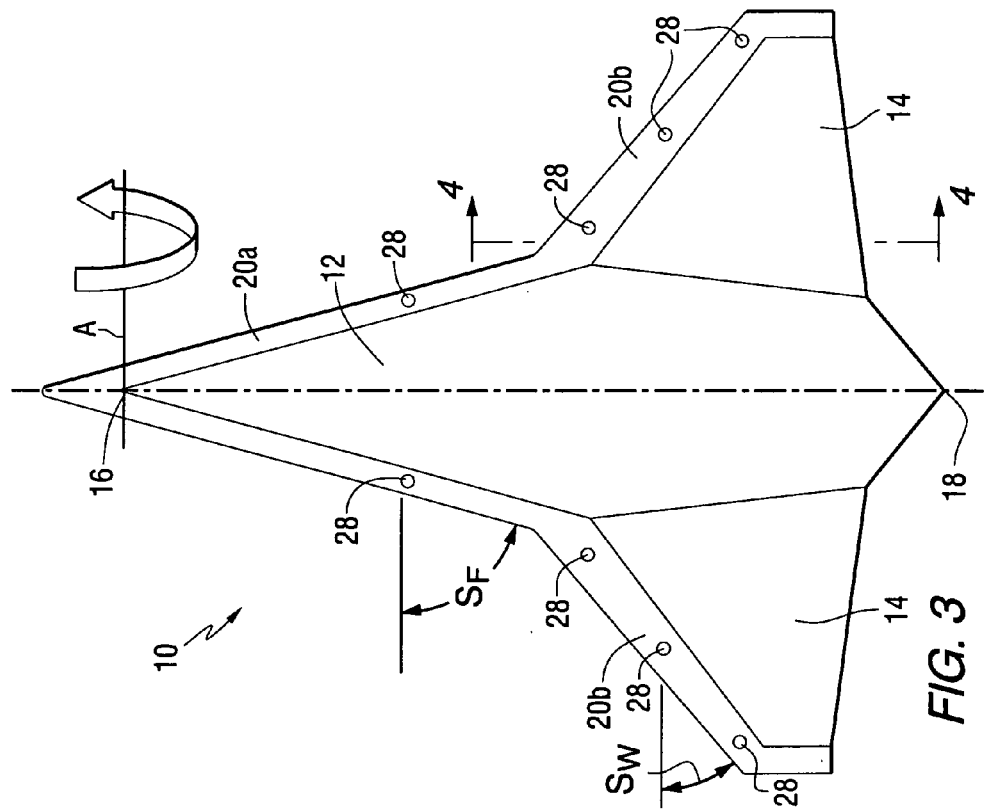

AIRCRAFT WITH ROTATABLE LEADING EDGE OF FUSELAGE AND WINGS

FIELD OF THE INVENTION

The present invention relates to aircraft with a rotatable leading edge, and more particularly relates to a combined fuselage and wing leading edge which can be rotated from an undeflected or retracted position against the fuselage and wings to a deflected or extended position which provides increased lift for the aircraft at low speeds.

BACKGROUND INFORMATION

Aircraft often utilize devices on leading wing edges in order to increase lift at low speeds. For example, aircraft with high leading edge wing sweep may use devices on the leading edges of the wings to increase lift during takeoff and landing and thus reduce runway length. Such leading edge devices typically have gaps that are visible from the front when the devices are stowed. However, some aircraft have survivability requirements that do not allow leading edge gaps when the devices are stowed. It would be desirable to provide a leading edge device which avoids such problems.

SUMMARY OF THE INVENTION

The present invention provides a rotatable leading edge for the fuselage and wings of an aircraft. The leading edge is a continuous, unbroken piece transversing the entire span of the aircraft. The leading edge may be rotated from an undeflected or retracted position adjacent to the fuselage and wings to a deflected or extended position away from the fuselage and wings which increases lift of the aircraft, particularly during takeoff, landing and other low speed operations. When the leading edge is retracted to its undeflected position during flight, unwanted gaps are avoided.

An aspect of the present invention is to provide an aircraft comprising a fuselage, wings connected to the fuselage, and a leading edge rotatable from a retracted position against the fuselage and wings to an extended position from the fuselage and wings.

This and other aspects of the present invention will be more apparent from the following description.

BRIEF DESCRIPTION OF THE DRAWINGS

FIG. 3 is a partially schematic top view of the aircraft of FIG. 1, with the rotatable leading edge in a deflected or extended position.

FIG. 5 is a partially schematic side view of an aircraft including a rotatable leading edge of the fuselage and wings in a retracted position in accordance with an embodiment of the present invention.

FIG. 6 is a partially schematic side view of the aircraft of FIG. 5, with the rotatable leading edge in an extended position.

FIG. 7 is a partially schematic front view of an aircraft including a rotatable leading edge of the fuselage and wings in a retracted position in accordance with an embodiment of the present invention.

FIG. 8 is a partially schematic front view of the aircraft of FIG. 7, with the rotatable leading edge in an extended position.

In FIG. 15, the Krueger flap is stowed and the leading edge is retracted. In FIG. 16, the Krueger flap remains stowed, but the leading edge is in an extended position. In FIG. 17, the Krueger flap is deployed and the leading edge is in the extended position.

DETAILED DESCRIPTION

Figure 1:
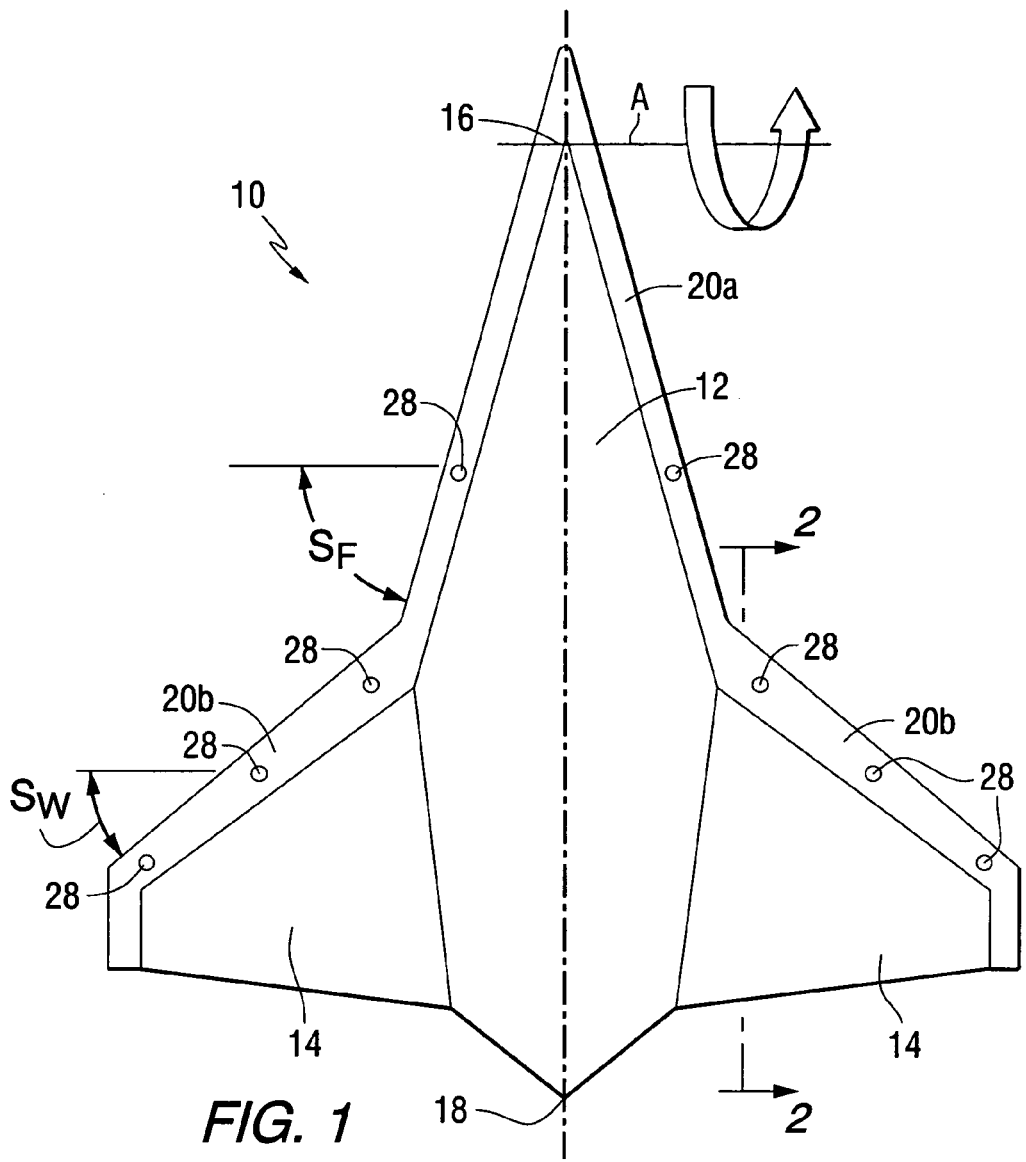
FIG. 1 is a partially schematic top view of an aircraft including a rotatable leading edge adjacent to the fuselage and wings of the aircraft in accordance with an embodiment of the present invention.

FIG. 1 is a partially schematic top view of an aircraft 10 including a fuselage 12 and wings 14. The aircraft 10 has a nose section 16 and a tail section 18. As used herein, the term "fuselage" includes the body of an aircraft as well as any structural features integrally formed with the body, such as strakes, leading edge extensions and the like, which have leading edges.

As shown in FIG. 1, a rotatable leading edge in accordance with an embodiment of the present invention includes a portion 20a adjacent to the fuselage 12, and portions 20b adjacent to the wings 14. The leading edge 20a, 20b is rotatable around an axis A that is substantially parallel with a transverse direction of the aircraft. In this embodiment, the axis of rotation A of the leading edge 20a, 20b is located adjacent to the nose 16 of the fuselage 12. However, the axis of rotation A may be located at any other suitable location along the longitudinal direction of the aircraft. For example, the axis of rotation A may be moved farther aft.

Figure 2:
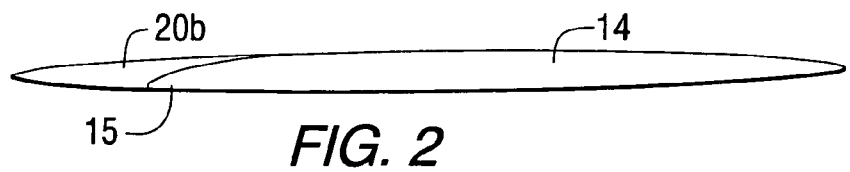
FIG. 2 is a partially schematic cross sectional view taken through section 2—2 of FIG. 1, illustrating a wing of the aircraft and a portion of the leading edge in an undeflected or retracted position in accordance with an embodiment of the present invention.

FIG. 2 is a cross sectional view of the wing 14 and leading edge 20b, taken through section 2—2 of FIG. 1. In FIGS. 1 and 2, the leading edge 20a, 20b is in a retracted position. In the retracted position, a portion of the leading edge 20b is seated against and contacts the wing 14.

Figure 4:
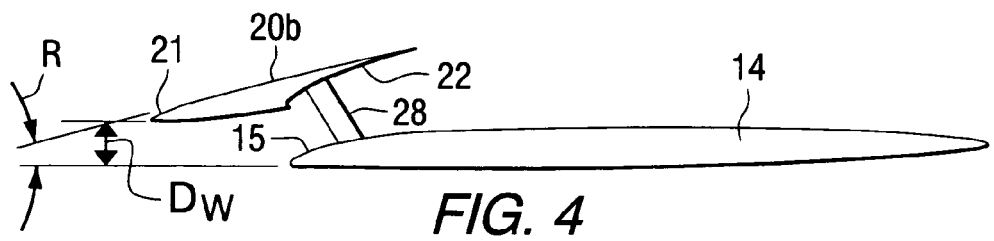
FIG. 4 is a partially schematic cross sectional view taken through section 4—4 of FIG. 3, illustrating the extended position of the leading edge with respect to the wing.

FIGS. 3 and 4 are similar views as shown in FIGS. 1 and 2, respectively, except the leading edge 20a, 20b has been rotated around the axis A through an arc R to an extended position. The extended position of the leading edge 20b is most clearly shown in FIG. 4, which is a cross sectional view of the wing 14 taken through line 4—4 of FIG. 3. As shown in FIG. 4, the leading edge 20b is in an extended position away from the wing 14. In the extended position, the leading edge 20b is elevated above the wing 14 a distance $D_W$. Since the leading edge 20a, 20b rotates around the axis A through an arc R, the elevated distance $D_W$ between the leading edge 20b and the wing 14 will vary depending upon the particular location along the wing 14.

Although not shown in FIG. 3 or 4, at least a portion of the leading edge 20a adjacent to the fuselage 12 is also elevated away from the fuselage 12 when the leading edge is in the extended position. If the axis of rotation A is moved farther aft from the location shown in FIGS. 1 and 3, the portion of the leading edge 20a behind the axis A may deflect upward while the portion of the leading edge in front of the axis A may deflect downward.

As can be seen most clearly in FIGS. 1 and 3, the wings 14 of the aircraft 10 have a sweep angle $S_W$ measured from a transverse direction of the aircraft. As can also be seen in FIGS. 1 and 3, the fuselage 12, including strakes and other structures having leading edges, may also have a sweep angle $S_F$ measured from the transverse direction of the aircraft 10. In the embodiment illustrated in FIGS. 1 and 3, the wing sweep angle $S_W$ is different from the fuselage sweep angle $S_F$, i.e., the wing sweep angle $S_W$ is less than the fuselage sweep angle $S_F$.

In the embodiments shown in FIGS. 1 and 3, the wing sweep angle $S_W$ remains constant along the wing 14, and the fuselage sweep angle $S_F$ remains constant along the fuselage 12. However, the wing sweep angle $S_W$ and/or the fuselage sweep angle $S_F$ may vary. Accordingly, although constant wing and fuselage sweep angles $S_W$ and $S_F$ are shown in the present figures, any other desired wing and fuselage configuration may be used in accordance with the present invention.

FIGS. 5 and 6 are partially schematic side views of an aircraft similar to that shown in FIGS. 1 and 3. In FIG. 5, the leading edge 20a, 20b is in the retracted position. In FIG. 6, the leading edge 20a, 20b is in the extended position, illustrating rotation of the leading edge 20a, 20b around an axis near the nose 16 of the aircraft. The leading edge may traverse an arc R, for example from about 0 to about 10 degrees, when rotated around the axis from the retracted to the extended position.

FIGS. 7 and 8 are partially schematic front views of an aircraft similar to that shown in FIGS. 1 and 3. In FIG. 7, the leading edge 20a, 20b is in the retracted position. In FIG. 8, the leading edge 20a, 20b is in the extended position.

The leading edge 20a, 20b is a continuous single piece from left wing tip to right wing tip and may be made of any suitable material. For example, the leading edge may comprise a substantially rigid material such as aluminum or conventional composite materials. The material will have no gaps extending to the physical leading edge or may show no gaps detectable in the electromagnetic spectrum.

The mechanism used to extend and retract the leading edge 20a, 20b may be any suitable linkage 28, such as a conventional double pivoted screwjack and four bar linkages. Any suitable controller for actuating the mechanism may be used, such as conventional manually operated controls or automatic controls for extending and retracting the leading edge based on airspeed.

Figure 9:
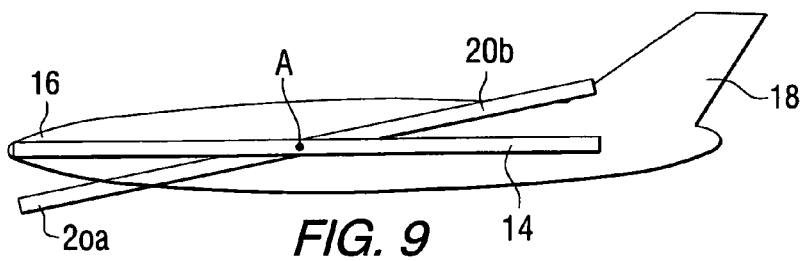
FIG. 9 is a partially schematic side view of an aircraft including a rotatable leading edge of the fuselage and wing similar to the embodiment shown in FIGS. 1–8, except the axis of rotation of the leading edge has been moved aft on the aircraft, and the portion of the leading edge in front of the rotational axis deflects downwardly while the portion of the leading edge behind the rotational axis deflects upwardly.

FIG. 9 is a partially schematic side view of an aircraft including a rotatable leading edge of the fuselage and wing similar to the embodiment shown in FIGS. 1–8, except the axis of rotation of the leading edge has been moved aft on the aircraft, and the portion of the leading edge in front of the rotational axis deflects downwardly while the portion of the leading edge behind the rotational axis deflects upwardly.

Figure 10:
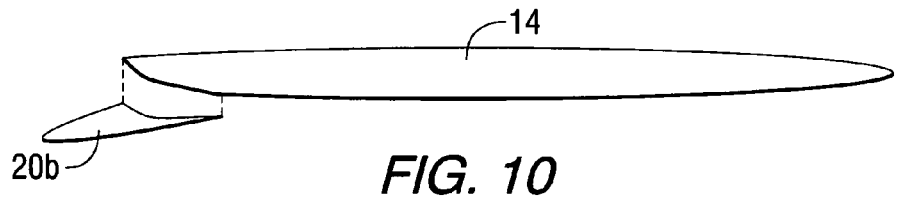
FIG. 10 is a partially schematic cross sectional view of a portion of an aircraft wing and a leading edge of the wing portion, illustrating downward deflection of the leading edge when the leading edge is in an extended position in accordance with an embodiment of the present invention.

FIG. 10 is a partially schematic cross sectional view of a portion of an aircraft wing and a leading edge of the wing portion, illustrating downward deflection of the leading edge when the leading edge is in an extended position in accordance with an embodiment of the present invention.

Figure 11:
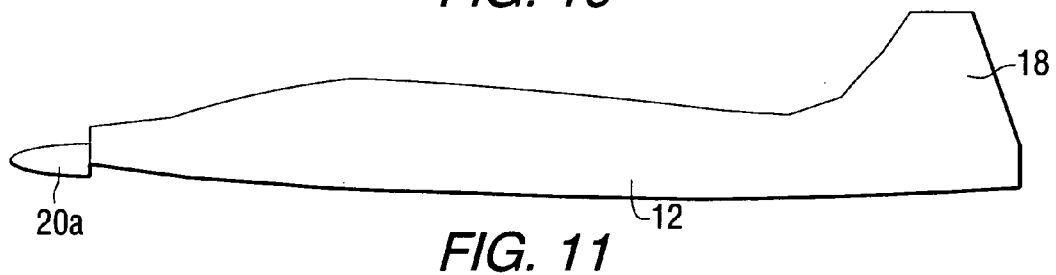
FIG. 11 is a partially schematic longitudinal sectional view of an aircraft fuselage and a leading edge of the fuselage, illustrating downward deflection of the leading edge when the leading edge is in an extended position in accordance with an embodiment of the present invention.

FIG. 11 is a partially schematic longitudinal sectional view of an aircraft fuselage and a leading edge of the fuselage, illustrating downward deflection of the leading edge when the leading edge is in an extended position in accordance with an embodiment of the present invention.

Figure 12:
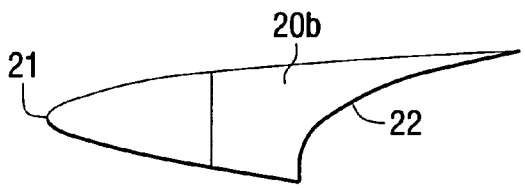
FIG. 12 is a partially schematic cross sectional view of a rotatable leading edge having a concave rear contact surface in accordance with an embodiment of the present invention.

FIG. 12 is a partially schematic cross sectional view of the leading edge 20b, which includes a front edge 21 and a rear contact surface 22. In the embodiment shown in FIG. 12, the rear contact surface 22 has a concave shape which conforms with the front edge 15 of the wing 14. Thus, the rear contact surface 22 and the front edge 15 are tightly seated against each other when the leading edge 20b is in the retracted position. This conforming arrangement of the rear contact surface 22 of the leading edge 20b and front edge 15 of the wing 14 can be seen in FIGS. 2 and 4.

As shown in FIGS. 2, 4 and 12, the front edge 21 of the leading edge 20b may have a relatively pointed shape, while the rear contact surface 22 and front edge 15 of the wing 14 may have a relatively rounded shape. Thus, the front edge 21 of the leading edge 20b has a smaller radius of curvature than the front edge 15 of the wing 14. This may be desirable in some aircraft because the rounder front edge 15 of the wing 14 may delay wing stall. The leading edge 20a or 20b forward of the rotation point A will have a rear contact shape to allow the leading edges to be deflected below its stowed position.

Figure 13:
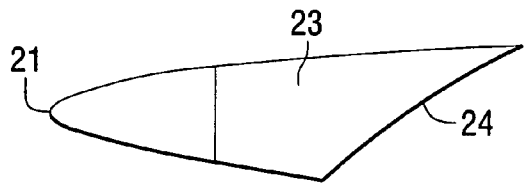
FIG. 13 is a partially schematic cross sectional view of a rotatable leading edge having a angled rear contact surface in accordance with an embodiment of the present invention.
Figure 14:
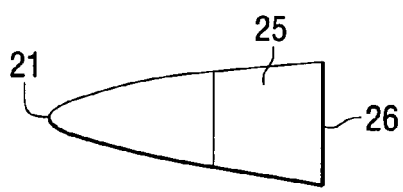
FIG. 14 is a partially schematic cross sectional view of a rotatable leading edge having a flat rear contact surface in accordance with an embodiment of the present invention.

FIGS. 13 and 14 illustrate alternative rear contact surface shapes of leading edges in accordance with embodiments of the present invention. In FIG. 13, the leading edge 23 has an angled contact surface 24. In FIG. 14, the leading edge 25 has a generally flat contact surface 26.

Figure 17:
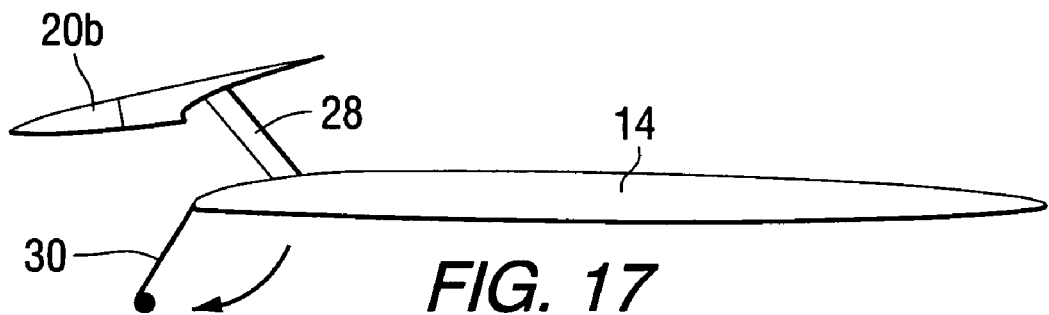
FIGS. 15–17 are partially schematic cross sectional views of an aircraft wing including a Krueger flap and a rotatable leading edge in accordance with an embodiment of the present invention.
Figure 16:
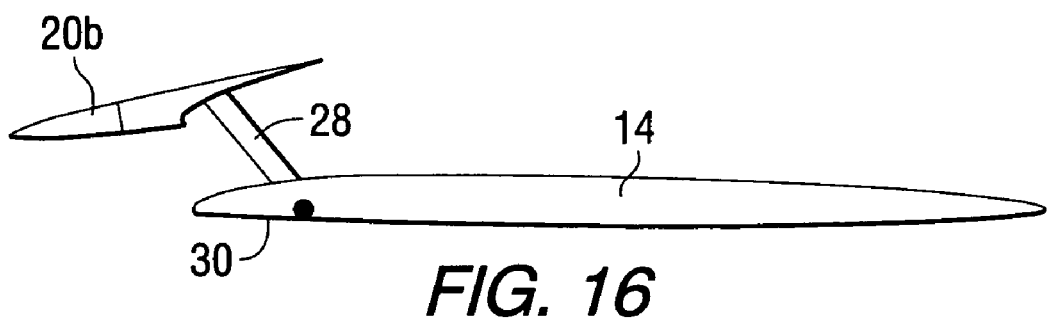
Figure 15:
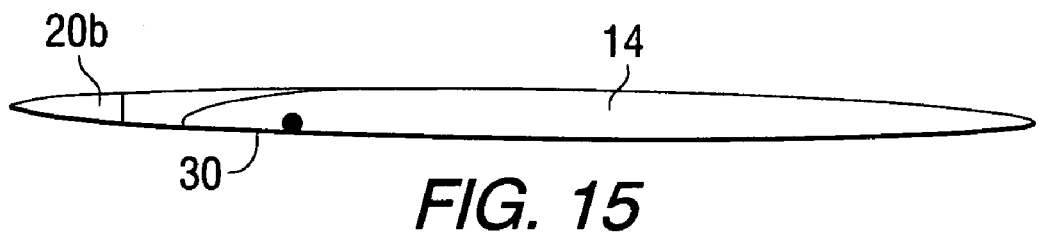

FIGS. 15–17 illustrate an embodiment of the present invention in which a conventional Krueger flap 30 is rotatably mounted on the wing 14. In FIG. 15, the leading edge 20b is in the retracted position, and the Krueger flap 30 is in the stowed position. In FIG. 16, the leading edge 20b is extended from the wing, while the Krueger flap 30 remains stowed. In FIG. 17, the leading edge 20b is extended and the Krueger flap 30 is rotated into a deployed position. Any known Krueger flap design and deployment mechanism may be used in accordance with this embodiment of the invention.

Whereas particular embodiments of this invention have been described above for purposes of illustration, it will be evident to those skilled in the art that numerous variations of the details of the present invention may be made without departing from the invention as defined in the appended claims.

What is claimed is:

1. An aircraft comprising:
   a fuselage;
   wings connected to the fuselage; and
   a unitary, rigid leading edge rotatable from a retracted position against the fuselage and wings to an extended position from the fuselage and wings, wherein the leading edge comprises a fuselage portion which forms a leading edge of the fuselage and wing portions which form leading edges of the wings, and wherein the leading edge comprises a rear contact surface which contacts the fuselage and wings when the leading edge is in the retracted position.

2. The aircraft of claim 1, wherein the leading edge comprises a structure without physical gaps or without gaps detectable in the electromagnetic spectrum.

3. The aircraft of claim 1, wherein the leading edge is rotatable around an axis substantially parallel with a transverse direction of the aircraft.

4. The aircraft of claim 3, wherein the axis of rotation of the leading edge is located adjacent to a nose of the fuselage.

5. The aircraft of claim 3, wherein the leading edge is rotatable around the axis from the retracted position to the extended position in an arc of from zero to about 10 degrees.

6. The aircraft of claim 1, wherein a portion of the leading edge adjacent to at least one of the wings is elevated when the leading edge is moved from the retracted position to the extended position.

7. The aircraft of claim 1, wherein a portion of the leading edge adjacent to the fuselage is elevated when the leading edge is moved from the retracted position to the extended position.

8. The aircraft of claim 1, wherein the wing portions of the leading edge have wing sweep angles measured from a transverse direction of the aircraft, the fuselage portion of the leading edge has a fuselage sweep angle measured from the transverse direction of the aircraft, and the wing sweep angles are different from the fuselage sweep angle.

9. The aircraft of claim 8, wherein the wing sweep angles are less than the fuselage sweep angle.

10. The aircraft of claim 1, wherein the rear contact surface has a shape which substantially conforms with a shape of the fuselage and a shape of the wings in areas of contact between the leading edge and the fuselage and wings.

11. The aircraft of claim 1, wherein at least a portion of the rear contact surface is concave.

12. The aircraft of claim 11, wherein the rear contact surface of the leading edge contacts a curved front edge of at least one of the wings, and the front edge of the wing has a larger radius of curvature than a front edge of the leading edge.

13. The aircraft of claim 1, wherein at least a portion of the rear contact surface is flat.

14. The aircraft of claim 1, further comprising Krueger flaps rotatably mounted on the wings.

15. The aircraft of claim 14, wherein the Krueger flaps are rotatable to deployed positions when the leading edge is in the extended position, and the Krueger flaps are rotatable to stowed positions when the leading edge is in the retracted position.

* * * * *